UNITED STATES PATENT OFFICE.

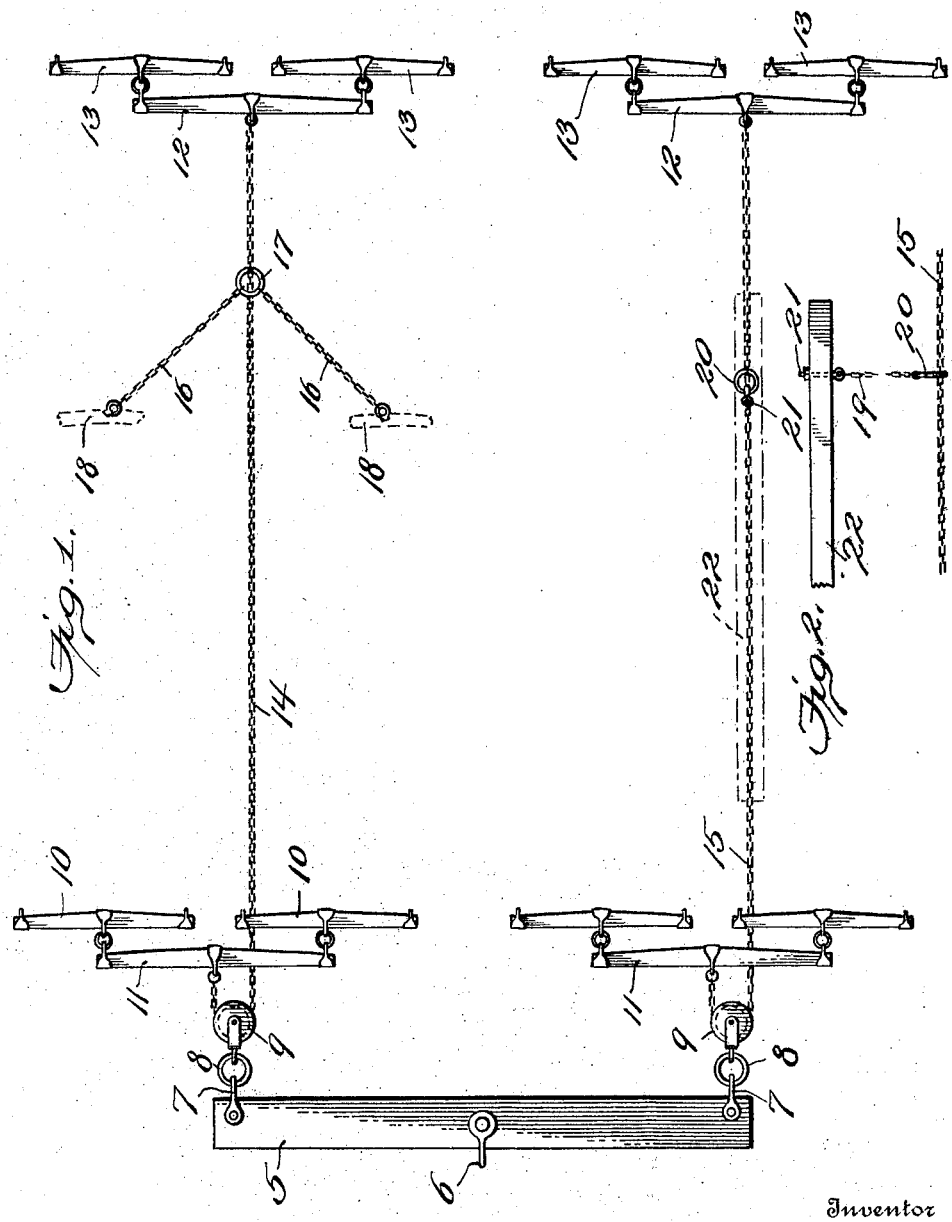

JENS W. BRODERSEN, OF BRITTON, SOUTH DAKOTA.

DRAFT-EQUALIZER.

1,321,711. Specification of Letters Patent. Patented Nov. 11, 1919.

Application filed August 12, 1918. Serial No. 249,464.

*To all whom it may concern:*

Be it known that I, JENS W. BRODERSEN, a citizen of the United States, residing at Britton, in the county of Marshall and State of South Dakota, have invented new and useful Improvements in Draft-Equalizers, of which the following is a specification.

This invention relates to draft equalizers, and the primary object of the same is to provide a device of this character adapted for use with a plurality of draft animals and to embody therein means for producing an equal strain or uniformity of draft on each of the animals, and with this end in view the invention consists in the construction and arrangement of the several parts which will be more fully hereinafter described and claimed.

In the drawings:

Figure 1 is a top plan view of a draft equalizer embodying the features of the invention.

Fig. 2 is a side elevation of a portion of the equalizer and showing a portion of a draft tongue.

The numeral 5 designates the main evener which is adapted to be attached to a vehicle and particularly a plow frame for which the improved draft equalizer has been specially devised. The evener 5 is attached at its center in any suitable manner to the plow frame by a clevis or analogous device 6 and at opposite ends has forwardly projecting clevises or loops 7 secured thereto and provided with attaching rings 8. Grooved pulleys 9 are connected to the attaching rings 8 and are free to swing in vertical and opposite lateral directions. The improved draft equalizer as shown in the drawing is adapted for eight draft animals arranged in teams of two and the rear or wheel teams are hitched to swingletrees 10 which are connected as usual to the opposite ends of doubletrees 11. In advance of the doubletrees 11 and swingletrees 10, similar doubletrees 12 and swingletrees 13 are arranged for the lead teams. Connected to the rear portion of the center of the doubletrees 11 are suitable draft chains 14 and 15 which are passed around or over the rear portions of the pulleys 9 and then extended forwardly under the doubletrees 11 and attached to the rear portions of the centers of the doubletrees 12 for the lead teams. These draft chains 14 and 15 constitute equalizing lead chains, and in view of the freedom of movement thereof over the pulleys 9, the draft strain on each animal of the rear teams and on each animal of the lead teams will be uniform and equalized and the animals will be forced to pull together or to regularly concentrate their pulling force on each extremity of the evener 5. The draft or equalizing lead chains 14 and 15 are unrestricted in their movement and function between the pulley 9 and the front doubletrees 12, there being no attachment of these chains to the rear draft devices or doubletrees 11 and swingletrees 10 except, as hereinbefore noted, to the centers of the doubletrees 11. Means are provided for holding the draft or lead chains 14 and 15 up between the rear draft teams and in advance of the latter, said means differing with respect to each draft or lead chain. In connection with the draft or lead chain 14, the means for holding up the same consists of two guide chains 16 which are welded or otherwise secured to a guide ring 17 through which the chain 14 loosely extends, the rear ends of the guide chains 16 being attached to the neck-yoke straps 18 of the harness of one team of horses as partially shown in the drawing. In connection with the draft or lead chain 15, a guide chain 19 is used and secured to a guide ring 20 similar to the ring 17 through which the said chain 15 also freely passes, the upper end of the guide chain 19 being connected by a bolt 21 to the front portion of the plow pole 22, as shown by Fig. 2. It will be understood that the angles of the guide chains 16 and 19 are such relatively to the chains 14 and 15 as to sustain the latter chains in elevated position.

The improved draft equalizer is simple in its construction and comparatively inexpensive in the cost of manufacture and application and it will be found exceptionally efficient in the performance of the function for which it has been devised. The main advantage of the improved draft equalizer as a whole is the equal strain imposed on each of the four teams and at no time can there be any binding or friction owing to the easy movement of the lead chains 14 and 15 engaging the pulleys 9. Moreover, the equalizer which is particularly adapted for eight draft animals will always have a working action with a free clear swing and thereby increases the power of the same.

What is claimed is:

A draft equalizer comprising a main evener with pulleys attached to opposite extremities of and located in advance of the front edge thereof, double and swingle trees arranged in advance of the opposite extremities of the evener and in longitudinal alinement in groups to accommodate draft teams with one in advance of the other, a draft equalizing lead chain secured to the center of the rear of each double tree adjacent to the main evener and freely movable through the pulleys of the latter and connected to the center of the rear portion of each advance double tree, each lead chain being passed under the double tree adjacent to the main evener and to one side of the center of said latter double tree, a tongue projecting forwardly in advance of the rear double tree and terminating in rear of the next advance double tree at one side of the center of the equalizer and having a guide chain extending downwardly and connected to a ring through which the one lead chain movably extends and two guide chains convergingly extending downwardly in advance of the rearmost double tree at the opposite side of the center of the equalizer and connected to a ring through which the remaining draft chain loosely extends, the said two guide chains being secured to portions of a harness of the one rear team.

In testimony whereof I have hereunto set my hand in presence of two subscribing witnesses.

JENS W. BRODERSEN.

Witnesses:
GUSTAV O. BRODERSENS,
FRED A. KENNER.